(12) United States Patent
Iwaki et al.

(10) Patent No.: US 10,889,359 B2
(45) Date of Patent: Jan. 12, 2021

(54) SMALL WATERCRAFT

(71) Applicant: YAMAHA HATSUDOKI KABUSHIKI KAISHA, Iwata (JP)

(72) Inventors: Ryutaro Iwaki, Shizuoka (JP); Shigeyuki Ozawa, Shizuoka (JP); Masaru Suzuki, Shizuoka (JP); Shingo Igarashi, Shizuoka (JP); Naoki Kinomoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 186 days.

(21) Appl. No.: 16/273,195

(22) Filed: Feb. 12, 2019

(65) Prior Publication Data
US 2019/0382093 A1 Dec. 19, 2019

(30) Foreign Application Priority Data

Jun. 14, 2018 (JP) ................. 2018-113676

(51) Int. Cl.
*B63H 21/21* (2006.01)
*B63H 21/00* (2006.01)
*B63B 34/10* (2020.01)
*G06F 15/02* (2006.01)

(52) U.S. Cl.
CPC ............ *B63H 21/21* (2013.01); *B63B 34/10* (2020.02); *B63H 21/24* (2013.01); *G06F 15/0283* (2013.01); *B63H 2021/216* (2013.01)

(58) Field of Classification Search
CPC .. B63H 2021/216; B63H 21/21; B63H 21/24; B63B 34/10
See application file for complete search history.

(56) References Cited

U.S. PATENT DOCUMENTS

| 8,510,456 B2* | 8/2013 | Okuyama ............... H04L 69/18 |
| | | 709/230 |
| 8,682,515 B2* | 3/2014 | Ito ........................ B63H 21/213 |
| | | 701/21 |
| 9,983,558 B2* | 5/2018 | Rencs ....................... G06F 9/38 |

(Continued)

FOREIGN PATENT DOCUMENTS

JP        5351611 B2    11/2013

*Primary Examiner* — Tyler J Lee
(74) *Attorney, Agent, or Firm* — Keating and Bennett, LLP

(57) ABSTRACT

A small watercraft includes an input, a second storage, and a controller. The input receives an operation to switch the small watercraft into one of a plurality of control states, and includes a first storage that stores first control information indicating the one of the plurality of control states associated with the operation received by the input. The second storage stores second control information indicating one of the plurality of control states. The controller is able to write to one of the first and second storages. The input is supplied with electric power by supplying the controller with the electric power. When the one of the plurality of control states indicated by the first control information is different from the one of the plurality of control states indicated by the second control information, the controller causes one of the first control information and the second control information stored in the one of the first and second storages to match the other of the first control information and the second control information stored in the other of the first and second storages.

12 Claims, 4 Drawing Sheets

(56) References Cited

U.S. PATENT DOCUMENTS

| | | | |
|---|---|---|---|
| 2007/0250222 A1* | 10/2007 | Okuyama | B63H 21/213 701/2 |
| 2007/0270055 A1* | 11/2007 | Ito | B63H 21/213 440/87 |
| 2007/0293102 A1* | 12/2007 | Okuyama | B63H 21/21 440/1 |
| 2008/0269970 A1* | 10/2008 | Yamada | B63H 21/213 701/21 |
| 2009/0043904 A1* | 2/2009 | Okuyama | H04L 67/12 709/230 |
| 2010/0305789 A1 | 12/2010 | Ito | |
| 2012/0277941 A1* | 11/2012 | Noffsinger | G01C 21/20 701/21 |
| 2016/0109934 A1* | 4/2016 | Woo | G06F 1/3265 345/211 |
| 2016/0357668 A1* | 12/2016 | Rencs | G06F 9/462 |
| 2019/0228666 A1* | 7/2019 | Lassini | G05D 1/0088 |
| 2020/0293307 A1* | 9/2020 | Matsuo | G06F 11/1433 |

\* cited by examiner

US 10,889,359 B2

SMALL WATERCRAFT

CROSS REFERENCE TO RELATED APPLICATIONS

This application claims the benefit of priority to Japanese Patent Application No. 2018-113676 filed on Jun. 14, 2018. The entire contents of this application are hereby incorporated herein by reference.

BACKGROUND OF THE INVENTION

1. Field of the Invention

The present invention relates to a small watercraft.

2. Description of the Related Art

A type of small watercraft conventionally known includes a controller for controlling an engine, i.e., an ECU (Engine Control Unit), and an immobilizer connected to the controller (see Japan Patent No. 5351611).

The immobilizer receives a user authentication code and a switch signal for switching an engine from a locked state to an unlocked state or vice versa from a key unit carried by a user. When user authentication processing is successfully done in the immobilizer, the controller switches the engine from the locked state to the unlocked state or vice versa based on the switch signal.

Incidentally, when it is assumed to install an input for receiving an operation to switch the engine into one of a plurality of control states, the engine is switchable into the control state relevant to the received operation by the input without using the immobilizer and the key unit. In this case, the control state of the engine is stored in each of the controller and the input.

However, when either the controller or the input is replaced with another, this possibly results in a discrepancy between the control state stored in the controller and the control state stored in the input.

SUMMARY OF THE INVENTION

Preferred embodiments of the present invention provide watercraft that are each able to correct discrepancies between control states thereof.

A watercraft according to a preferred embodiment of the present invention includes an input, a second storage, and a controller. The input receives an operation to switch the small watercraft into one of a plurality of control states, and includes a first storage that stores first control information indicating the one of the plurality of control states associated with the operation received by the input. The second storage stores second control information indicating one of the plurality of control states. The controller is configured or programmed to write to one of the first and second storages. The input is supplied with electric power by supplying the controller with electric power. When the one of the plurality of control states indicated by the first control information is different from the one of the plurality of control states indicated by the second control information, the controller is configured or programmed to cause one of the first control information and the second control information stored in the one of the first and second storages to match the other of the first control information and the second control information stored in the other of the first and second storages.

According to preferred embodiments of the present invention, it is possible to provide watercraft that are each able to correct a discrepancy between control states thereof.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Small watercraft according to preferred embodiments of the present invention will be hereinafter explained with reference to drawings.

Figure 1:
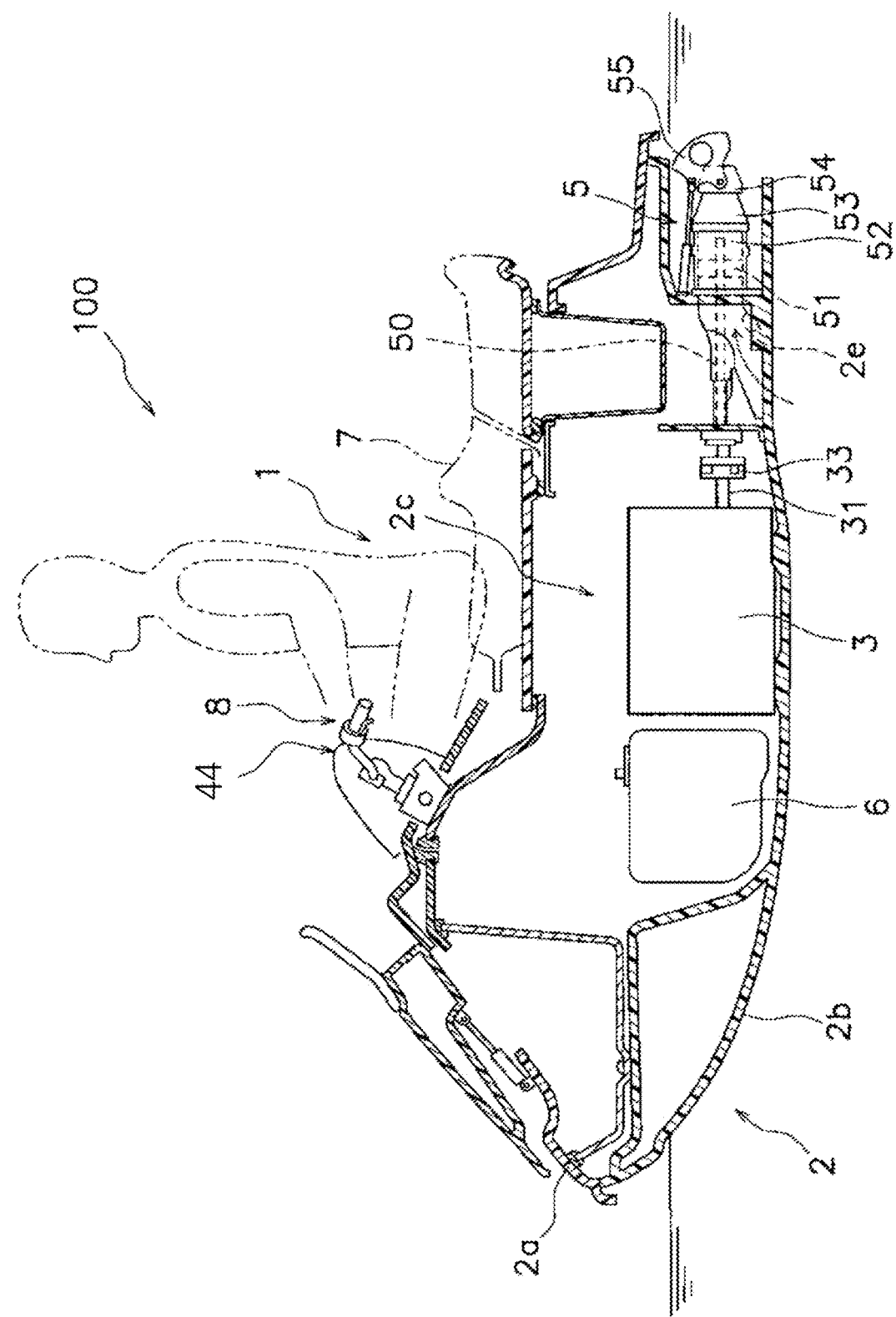
FIG. 1 is a cross-sectional view of an entire configuration of a small watercraft according to a preferred embodiment of the present invention.
Figure 2:
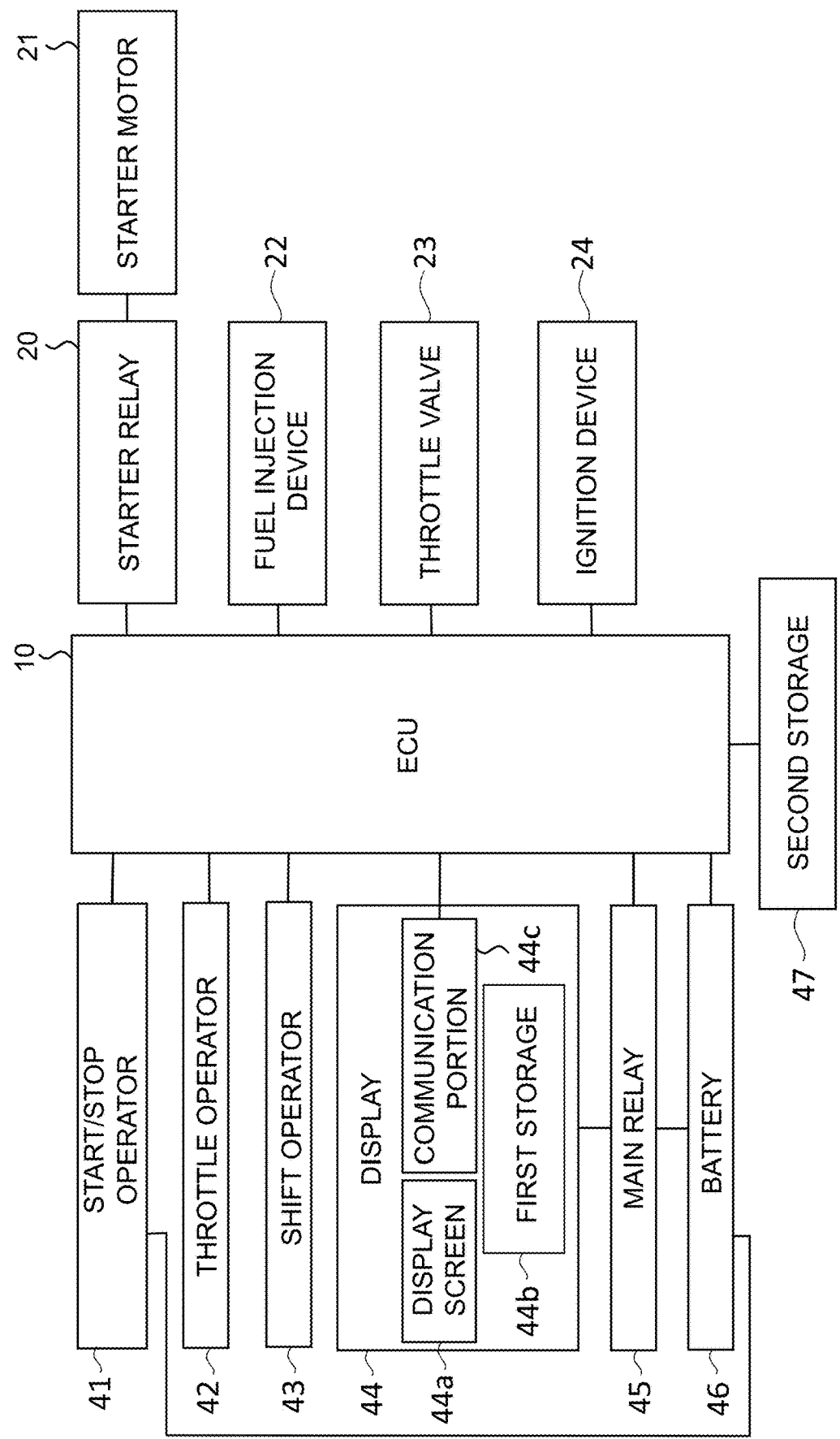
FIG. 2 is a block diagram of a control system of the small watercraft according to a preferred embodiment of the present invention.

FIG. 1 is a cross-sectional view of an entire configuration of a small watercraft 100 according to a preferred embodiment of the present invention. FIG. 2 is a block diagram of a control system of the small watercraft 100. The small watercraft 100 is, for example, a so-called personal watercraft (PWC). The small watercraft 100 includes a watercraft unit 1 shown in FIG. 1 and an ECU (Engine Control Unit) 10 shown in FIG. 2.

As shown in FIG. 1, the watercraft unit 1 includes a vessel body 2, an engine 3, and a jet propulsion device 5. The vessel body 2 includes a deck 2*a* and a hull 2*b*. The vessel body 2 is provided with an engine room 2*c* in the interior thereof. The engine room 2*c* accommodates the engine 3, a fuel tank 6 and so forth. A seat 7 is attached to the deck 2*a*. The seat 7 is disposed directly above the engine 3. A steering handle 8 is disposed in front of the seat 7 in order to steer the vessel body 2.

The engine 3 is, for example, an inline four-cylinder four-stroke engine. The engine 3 includes a crankshaft 31. The crankshaft 31 extends in a back-and-forth direction. As shown in FIG. 2, the watercraft unit 1 includes a starter relay 20, a starter motor 21, fuel injection devices 22, at least one throttle valve 23, and ignition devices 24. The starter relay 20 is turned on/off by the ECU 10. When the starter relay 20 is turned on, the starter motor 21 is supplied with electric power. The starter motor 21 starts the engine 3 when supplied with electric power from the starter relay 20. Each fuel injection device 22 injects fuel to be supplied to a combustion chamber of the engine 3. The amount of mixture gas to be fed to the combustion chamber is regulated by changing the opening degree of the at least one throttle valve 23. Each ignition device 24 ignites the fuel inside the combustion chamber. It should be noted that although not shown in FIG. 2, each of the plurality of cylinders of the engine 3 is provided with a fuel injection device 22 and an ignition device 24. A single throttle valve 23 may be provided in common for the plurality of cylinders of the engine 3, or alternatively, a plurality of throttle valves 23 may be provided for the plurality of cylinders of the engine 3, respectively.

The jet propulsion device 5 is driven by the engine 3, and sucks in and spouts out water surrounding the vessel body 2. As shown in FIG. 1, the jet propulsion device 5 includes an impeller shaft 50, an impeller 51, an impeller housing 52, a nozzle 53, a deflector 54, and a reverse bucket 55. The impeller shaft 50 extends rearward from the engine room 2c. The front portion of the impeller shaft 50 is coupled to the crankshaft 31 through a coupling 33. The rear portion of the impeller shaft 50 extends into the impeller housing 52 through a water suction portion 2e of the vessel body 2. The impeller 51 is attached to the rear portion of the impeller shaft 50. The impeller 51 is disposed in the interior of the impeller housing 52. The impeller 51 is rotated together with the impeller shaft 50 so as to draw water in from the water suction portion 2e. The impeller housing 52 is connected to the rear portion of the water suction portion 2e. The nozzle 53 is disposed behind the impeller housing 52. The nozzle 53 rearwardly spouts the water drawn in by the impeller 51. In the present preferred embodiment, the nozzle 53 is capable of changing the spouting direction of the water in an up-and-down direction in response to operating a trim adjustment switch provided on the steering handle 8.

The deflector 54 is disposed behind the nozzle 53. The deflector 54 is capable of changing the direction of water spouted from the nozzle 53 in a right-and-left direction. The reverse bucket 55 is disposed behind the deflector 54. The reverse bucket 55 is capable of changing the direction of water spouted from the nozzle 53 and the deflector 54 in the forward direction.

As shown in FIG. 2, the watercraft unit 1 includes operators including a start/stop operator 41, a throttle operator 42, a shift operator 43, and so forth. These operators are operated by a driver of the watercraft. The start/stop operator 41 starts the engine 3. The start/stop operator 41 is, for example, a switch. The start/stop operator 41 is electrically connected to each of the ECU 10 and a battery 46. The throttle operator 42 increases and reduces the engine rotational speed. The throttle operator 42 increases the engine rotational speed by changing the opening degree of the at least one throttle valve 23. The throttle operator 42 is, for instance, a throttle lever. The shift operator 43 switches between forward movement and rearward movement of the watercraft unit 1. The shift operator 43 switches between forward movement and backward movement of the watercraft unit 1 by operating the position of the reverse bucket 55. The shift operator 43 is, for example, a shift lever.

As shown in FIGS. 1 and 2, the watercraft unit 1 includes a display 44. The display 44 functions not only as "a display" that displays a variety of information regarding the small watercraft 100 but also as "an input" that receives, from the driver, an operation to switch the control state of the watercraft in which the display 44 is installed. The display 44 is, for example, a touchscreen display. The display 44 includes a display screen 44a, a first storage 44b, and a communication portion 44c.

Figure 3:
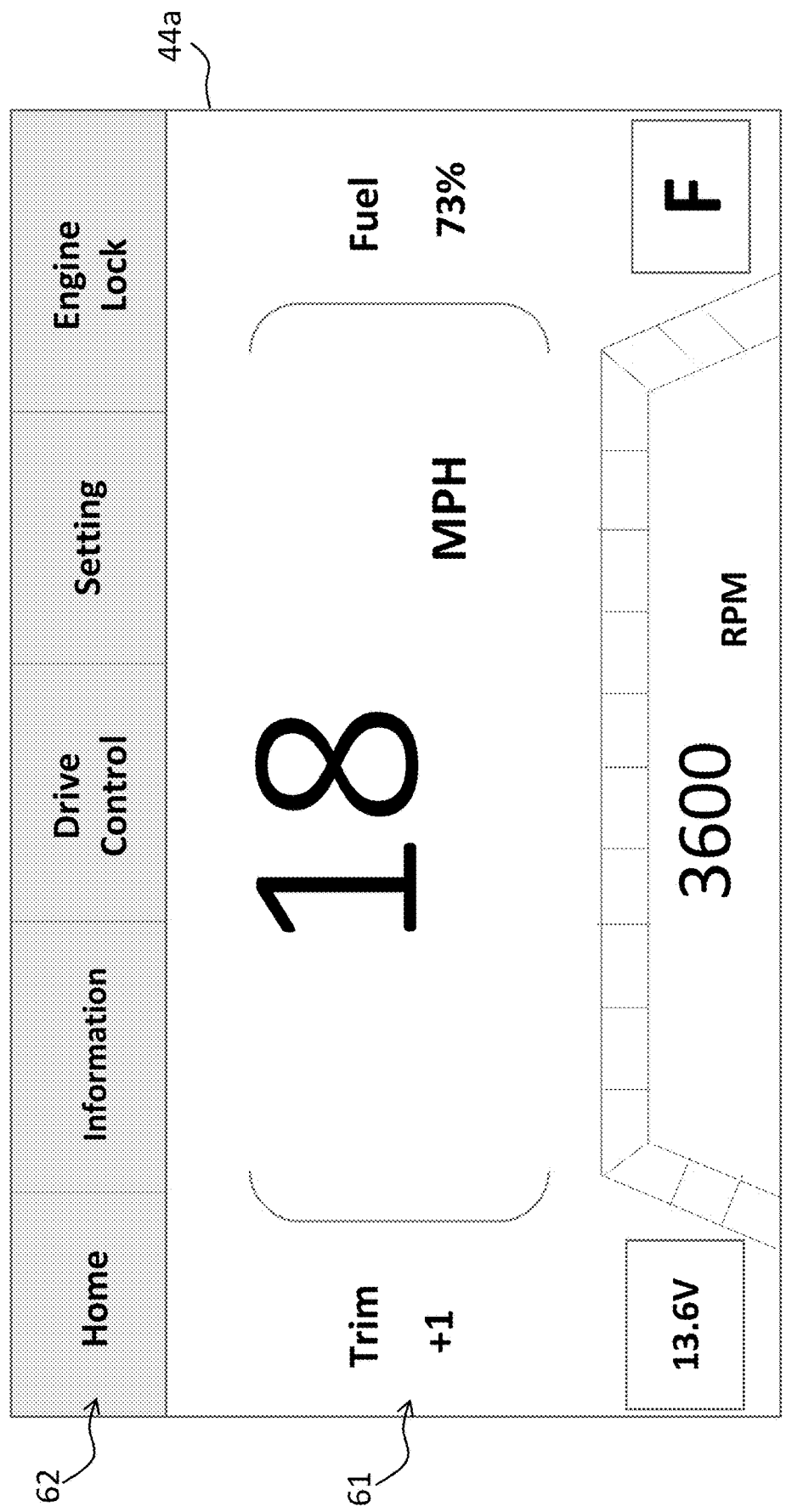
FIG. 3 is an exemplary screen displayed on a display according to a preferred embodiment of the present invention.

The display screen 44a displays the variety of information regarding the small watercraft 100 and also detects a touch operation by the driver. FIG. 3 is an example of what may be displayed on the display screen 44a. The display screen 44a may include a first display screen 61 and a second display screen 62, for example. The first display screen 61 is disposed directly below the second display screen 62. The first display screen 61 displays the velocity of the watercraft unit 1, the rotational speed of the engine 3, the trim angle of the nozzle 53, the remaining amount of fuel, the voltmeter of the battery 46, the operating position of the shift operator 43 and so forth. The second display screen 62 displays a home button, an information button, a drive control button, a setting button, and an engine lock button. When any of the buttons displayed on the second display screen 62 is touched by the driver, information related to the touched button is displayed on the first display screen 61. For example, when the engine lock button is touched by the driver, a button (or buttons) that switches the lock mode of the engine 3 is displayed on the first display screen 61. In this case, the driver is able to set the lock mode of the engine 3 to either a locked state or an unlocked state via the switching button (or buttons). Therefore, the display 44 also functions as "a key" of the engine 3 as well.

A non-volatile memory, for example, is provided as the first storage 44b. The first storage 44b stores the lock mode (the locked state or the unlocked state) of the engine 3, received from the driver through the display screen 44a, as first control information indicating the control state of the watercraft in which the display 44 is installed. The communication portion 44c outputs the first control information stored in the first storage 44b to the ECU 10 at predetermined time intervals (e.g., about 59 milliseconds).

As shown in FIG. 2, the watercraft unit 1 includes a main relay 45 and the battery 46. The main relay 45 is electrically connected to each of the ECU 10, the display 44, and the battery 46. The main relay 45 is turned on/off by the ECU 10. When the main relay 45 is turned on, electric power from the battery 46 is supplied to each of the ECU 10 and the display 44.

As shown in FIG. 2, the watercraft unit 1 further includes a second storage 47. A non-volatile memory, for example, is provided as the second storage 47. The second storage 47 stores the lock mode (the locked state or the unlocked state) of the engine 3 as second control information indicating the control state of the watercraft in which the second storage 47 is installed. The second control information, stored in the second storage 47, is written by the ECU 10. The ECU 10 writes the first control information, obtained from the display 44, to the second storage 47 as the second control information. Therefore, the second control information stored in the second storage 47 normally matches the first control information stored in the first storage 44b of the display 44. In other words, the lock mode of the engine 3, indicated by the second control information, is normally the same as that indicated by the first control information. However, when the first storage 44b is replaced with a new storage when replacing the display 44, or alternatively, when the second storage 47 is replaced with a new storage when replacing the ECU 10, this can result in a discrepancy between the second control information stored in the second storage 47 and the first control information stored in the first storage 44b of the display 44. For example, it is assumed that both of the first control information and the second control information indicates "the locked state". At this time, when the second storage 47 is replaced with a new storage in which "the unlocked state" is stored as the second control information, this results in a discrepancy of the second control information from the first control information. In this case, as described below, the ECU 10 executes a control to cause the second control information to match the first control information.

The ECU 10 is an example of "a controller" according to a preferred embodiment of the present invention. The ECU 10 controls the engine 3.

When the start/stop operator 41 is operated when the engine 3 is stopped, the ECU 10 is activated by the electric power supplied thereto from the battery 46 via the start/stop operator 41, and then, causes electric current to flow through a coil embedded in the main relay 45 such that the main relay 45 is turned on. Accordingly, the flow of electric power supplied to the ECU 10 via the start/stop operator 41 is switched into the flow of electric power supplied to the ECU 10 via the main relay 45, and simultaneously, the display 44 is activated. Thus, the display 44 is supplied with electric power by supplying the ECU 10 with electric power.

The ECU 10 executes an operation to start the engine 3 simultaneously with the operation to activate the ECU 10 and the display 44. Specifically, when the start/stop operator 41 is operated, the ECU 10 starts counting an operating time (e.g., a pressing time) of the start/stop operator 41. When the operating time of the start/stop operator 41 exceeds a predetermined period of time, the ECU 10 determines which of "the unlocked state" and "the locked state" is indicated by the second control information stored in the second storage 47. When the second control information indicates "the unlocked state", the ECU 10 causes electric current to flow through a coil embedded in the starter relay 20 so as to drive the starter motor 21, such that the engine 3 is started. In contrast, when the second control information indicates "the locked state", the ECU 10 does not cause electric current to flow through the coil embedded in the starter relay 20.

When the start/stop operator 41 is operated during operation of the engine 3, the ECU 10 causes each fuel injection device 22 to stop fuel injection so as to stop the engine 3, and turns off the main relay 45 so as to deactivate the ECU 10 and the display 44.

The ECU 10 obtains the first control information from the communication portion 44c of the activated display 44. In the present preferred embodiment, it takes a longer period of time for the ECU 10, after activation thereof, to obtain the first control information from the display 44 than to start the engine 3. In other words, the ECU 10 quickly starts the engine 3 before starting communication with the display 44.

The ECU 10 is connected to the second storage 47. The ECU 10 is configured or programmed to transmit information to the second storage 47. The ECU 10 writes the first control information, obtained from the display 44, to the second storage 47 as the second control information. Therefore, as described above, the second control information normally matches the first control information. However, when the ECU 10 or the display 44 is replaced with a new one, chances are that the second control information no longer matches the first control information. In view of this, as described below, the ECU 10 executes the control to cause the second control information to match the first control information.

Figure 4:
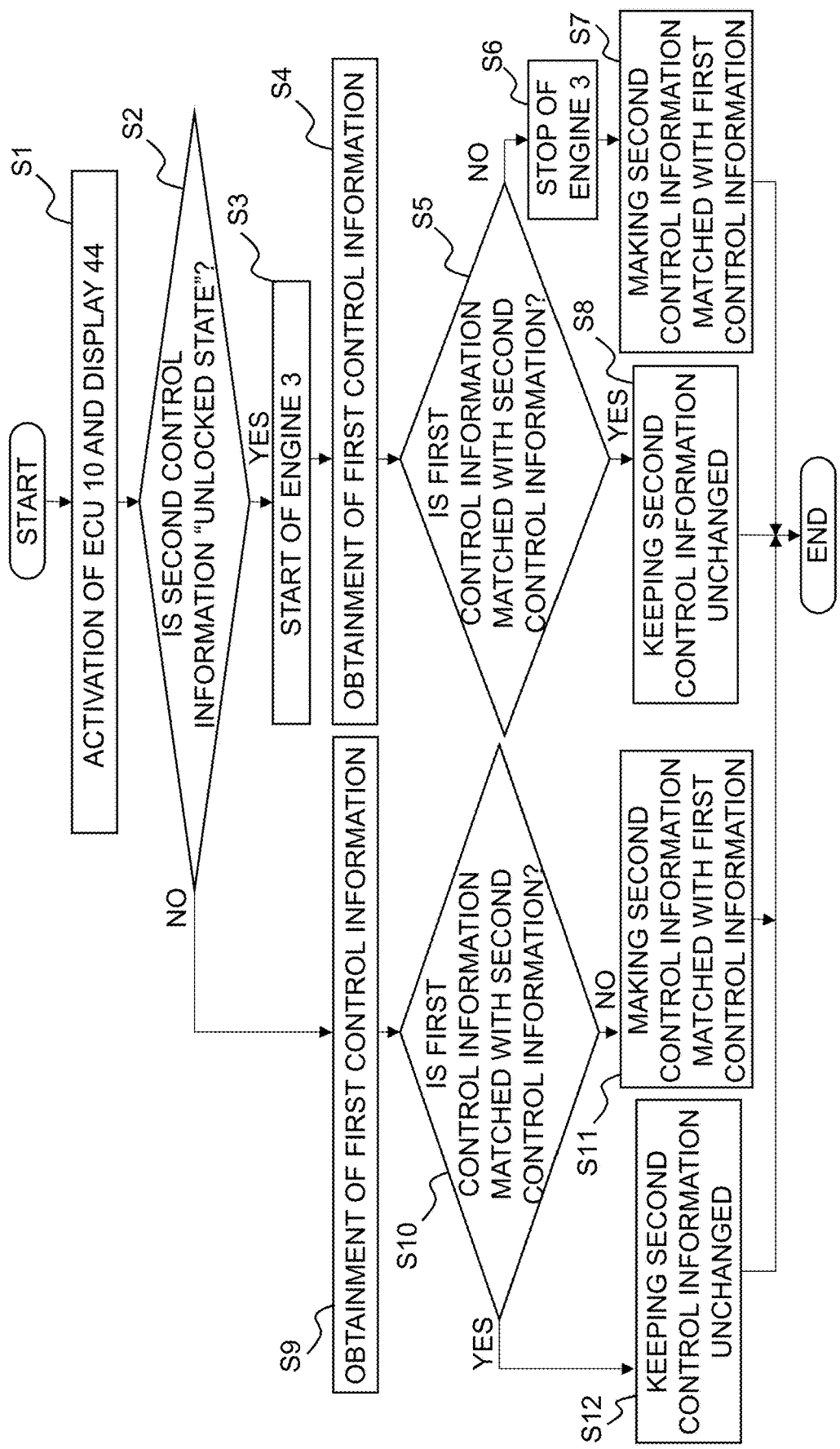
FIG. 4 is a flowchart for explaining control by an ECU according to a preferred embodiment of the present invention.

FIG. 4 is a flowchart for explaining the control performed by the ECU 10.

In step S1, when the start/stop operator 41 is operated (e.g., pressed) when the engine 3 is stopped, the ECU 10 is activated by the electric power supplied from the battery 46 via the start/stop operator 41, and then turns on the main relay 45. Accordingly, the display 44 is activated.

In step S2, the ECU 10 determines whether or not the second control information stored in the second storage 47 indicates "the unlocked state". When the second control information indicates "the unlocked state", the process proceeds to steps S3 to S8. When the second control information does not indicate "the unlocked state" (i.e., when the second control information indicates "the locked state"), the process proceeds to steps S9 to S12.

First, explanation will be made regarding the situation in step S2 in which it is determined that the second control information stored in the second storage 47 indicates "the unlocked state". In step S3, the ECU 10 drives the starter motor 21 when the operating time of the start/stop operator 41 exceeds the predetermined period of time. Accordingly, the engine 3 is started. In step S3, without waiting for the determination process in step s5, the engine 3 is started in advance. Hence, the engine 3 is able to be quickly started in response to operating the start/stop operator 41.

In step S4, the ECU 10 obtains the first control information, stored in the first storage 44b of the display 44, from the communication portion 44c of the display 44.

In step S5, the ECU 10 determines whether or not the first control information stored in the first storage 44b matches the second control information stored in the second storage 47.

In step S5, when it is determined that the first control information does not match the second control information (i.e., when the first control information indicates "the locked state" whereas the second control information indicates "the unlocked state"), the ECU 10 causes each fuel injection device 22 to stop fuel injection in step S6. Accordingly, the engine 3 is stopped. As herein described, the engine 3 is stopped after once started, because priority should be placed on quick starting of the engine 3, but simultaneously, the engine 3 should be, in principle, controlled based on the information of the display 44 functioning as "a key" reflecting the driver's intention. Thereafter, in step S7, the ECU 10 causes the second control information to match the first control information. Specifically, the ECU 10 changes "the unlocked state" indicated by the second control information into "the locked state" such that the second control information indicates the same control state as the first control information. Accordingly, a discrepancy between the control states is corrected in the watercraft in which the ECU 10 is installed.

On the other hand, when it is determined that the first control information matches the second control information (i.e., when the first control information indicates "the unlocked state", and simultaneously, the second control information indicates "the unlocked state") in step S5, the ECU 10 keeps "the unlocked state" indicated by the second control information in step S8 unchanged. Accordingly, driving of the engine 3 is continued.

Next explanation will be made regarding the other situation in step S2 in which it is determined that the second control information stored in the second storage 47 does not indicate "the unlocked state" (i.e., when the second control information indicates "the locked state"). In step S9, without starting the engine 3, the ECU 10 obtains the first control information, stored in the first storage 44b of the display 44, from the communication portion 44c of the display 44.

In step S10, the ECU 10 determines whether or not the first control information matches the second control information.

In step S10, when it is determined that the first control information does not match the second control information (i.e., when the first control information indicates "the unlocked state" whereas the second control information indicates "the locked state"), the ECU 10 causes the second control information to match the first control information without starting the engine 3 in step S11. Specifically, the ECU 10 changes "the locked state" indicated by the second control information into the "unlocked state" such that the second control information indicates the same control state as the first control information. Accordingly, a discrepancy between the control states is corrected in the watercraft in which the ECU 10 is installed.

On the other hand, when it is determined that the first control information matches the second control information (i.e., when the first control information indicates "the locked state", and simultaneously, the second control information indicates "the locked state") in step S10, the ECU 10 keeps "the locked state" indicated by the second control information unchanged without starting the engine 3 in step S12.

When the process of step S11 or S12 is finished without starting the engine 3, the ECU 10 has not started the engine 3 even if the start/stop operator 41 has been continuously operated (e.g., pressed) by the driver since step S1. For example, when the start/stop operator 41 is pressed, the first control information and the second control information are matched as "the unlocked state" in step S11. When the start/stop operator 41 is then pressed again, the engine 3 is started in step S3 because both the first control information and the second control information indicate "the unlocked state", and the control state indicated by the second control information is kept unchanged in step S8. However, in FIG. 4, the step of starting the engine 3 may be set after step S10 and before/after step S11.

Preferred embodiments of the present invention have been described above. However, the present invention is not limited to the preferred embodiments described above, and a variety of changes can be made without departing from the gist of the present invention.

In the above-described preferred embodiments, the ECU 10, which causes the second control information to match the first control information, has been described as an example of "the controller". However, "the controller" is not limited to the ECU 10. For example, the display 44 may include, as "the controller", a CPU (Central Processing Unit) that causes the first control information to matched the second control information. In this case, the ECU 10 is not required to cause the second control information to match the first control information. Alternatively, when the CPU, included in the display 44, is designed to have a function to control the engine 3, the small watercraft 100 may not include the ECU 10.

In the above-described preferred embodiments, each of the first control information and the second control information indicates either of the locked state and the unlocked state of the engine 3. However, "the control information" is not limited to the above. For example, each of the first control information and the second control information may include any one of a plurality of operating modes of the engine 3. In this case, when the operating mode indicated by the first control information and that indicated by the second control information do not match, the ECU 10 causes the operating mode indicated by the second control information to match that indicated by the first control information. Accordingly, a discrepancy between the control states is corrected in the watercraft in which the ECU 10 is installed. Alternatively, each of the first control information and the second control information may indicate any one of a plurality of display modes in the display screen 44*a*. In this case, when the display mode indicated by the first control information and that indicated by the second control information do not match, the ECU 10 causes the display mode indicated by the second control information to match that indicated by the first control information. Accordingly, a discrepancy between the control states is corrected in the watercraft in which the ECU 10 is installed.

In the above-described preferred embodiments, the ECU 10 supplies electric power from the battery 46 to the display 44 through the main relay 45. However, the display 44 may be directly connected to the battery 46 without interposing the main relay 45 therebetween.

In the above-described preferred embodiments, the display 44, which is preferably a touchscreen display, has been described as an example of "the input". However, "the input" is not limited to the above. For example, physical switches, physical buttons or so forth may be used as "the input".

In the above-described preferred embodiments, as shown in FIG. 4, the determination step for the second control information (step S2) is executed after the step of activating the ECU 10 and the display 44 (step S1). However, these steps may be executed in reverse order or may be executed simultaneously.

In the above-described preferred embodiments, as shown in FIG. 4, the step of obtaining the first control information (step S4) is executed after the step of starting the engine 3 (step S3). However, these steps may be executed in reverse order or may be executed simultaneously.

In the above-described preferred embodiments, as shown in FIG. 4, the step of changing the second control information (step S7) is executed after the step of stopping the engine 3 (step S6). However, these steps may be executed in reverse order or may be executed simultaneously.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft comprising:
   an input that receives an operation to switch the watercraft into one of a plurality of control states, the input including a first storage that stores first control information that indicates the one of the plurality of control states associated with the operation received by the input;
   a second storage that stores second control information that indicates one of the plurality of control states; and
   a controller configured or programmed to write to one of the first and second storages; wherein
   the input is supplied with electric power that is supplied to the controller; and
   when the one of the plurality of control states indicated by the first control information is different from the one of the plurality of control states indicated by the second control information, the controller is configured or programmed to cause the one of the first control information and the second control information stored in the one of the first and second storages to match the other of the first control information and the second control information stored in the other of the first and second storages.

2. The watercraft according to claim 1, further comprising:
   an engine; wherein
   the first control information indicates one of a locked state and an unlocked state of the engine; and
   the second control information indicates one of the locked state and the unlocked state of the engine.

3. The watercraft according to claim 2, wherein the controller includes an ECU that controls the engine and that is connected to the second storage; and
   when the controller starts the engine and the second control information indicates the unlocked state, the controller is configured or programmed to stop the engine and change the second control information stored in the second storage into the first control information when the first control information indicates the locked state.

4. The watercraft according to claim 3, wherein the controller is configured or programmed to take a longer period of time after activation thereof to obtain the first control information from the input than to start the engine.

5. The watercraft according to claim 3, further comprising:
a battery; and
a main relay connected to the battery, the input, and the controller; wherein
the controller supplies the electric power to the input from the battery through the main relay.

6. The watercraft according to claim 2, wherein
the controller includes an ECU that controls the engine and that is connected to the second storage; and
when the controller starts the engine and the second control information indicates the unlocked state, the controller is configured or programmed to keep the second control information stored in the second storage unchanged when the first control information indicates the unlocked state.

7. The watercraft according to claim 2, wherein
the controller includes an ECU that controls the engine and that is connected to the second storage; and
the controller is configured or programmed to change the second control information stored in the second storage into the first control information when the first control information indicates the unlocked state but the second control information indicates the locked state.

8. The watercraft according to claim 7, wherein the controller is configured or programmed to change the second control information stored in the second storage into the first control information without starting the engine.

9. The watercraft according to claim 2, wherein
the controller includes an ECU that controls the engine and that is connected to the second storage; and
the controller is configured or programmed to keep the second control information stored in the second storage unchanged when the first control information indicates the locked state and the second control information indicates the locked state.

10. The watercraft according to claim 9, wherein the controller is configured or programmed to keep the second control information stored in the second storage unchanged without starting the engine.

11. The watercraft according to claim 1, wherein the input includes a touchscreen display.

12. The watercraft according to claim 1, further comprising:
an engine; wherein
the first control information indicates any one of a plurality of operating modes of the engine; and
the second control information indicates any one of the plurality of operating modes of the engine.

* * * * *